US012786932B2

(12) United States Patent
Zhou

(10) Patent No.: US 12,786,932 B2
(45) Date of Patent: Nov. 3, 2026

(54) POSITIONING METHOD AND APPARATUS

(71) Applicant: Huawei Technologies Co., Ltd., Shenzhen (CN)

(72) Inventor: Runze Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 407 days.

(21) Appl. No.: 18/512,808

(22) Filed: Nov. 17, 2023

(65) Prior Publication Data

US 2024/0089899 A1 Mar. 14, 2024

Related U.S. Application Data

(63) Continuation of application No. PCT/CN2022/089314, filed on Apr. 26, 2022.

(30) Foreign Application Priority Data

May 18, 2021 (CN) ......................... 202110540425.1

(51) Int. Cl.
*H04W 64/00* (2009.01)
*H04W 24/10* (2009.01)

(52) U.S. Cl.
CPC ........... *H04W 64/00* (2013.01); *H04W 24/10* (2013.01)

(58) Field of Classification Search
None
See application file for complete search history.

(56) References Cited

U.S. PATENT DOCUMENTS 10,506,543 B1 * 12/2019 Edge ..................... H04W 24/10
2018/0199160 A1 * 7/2018 Edge ....................... H04W 4/02
2019/0053010 A1 2/2019 Edge et al.
2020/0053686 A1 2/2020 Edge et al.
2020/0267681 A1 8/2020 Ferrari et al.
2022/0022115 A1 * 1/2022 Edge ..................... H04W 36/08

FOREIGN PATENT DOCUMENTS

CN 111436019 A 7/2020

OTHER PUBLICATIONS

"3rd Generation Partnership Project; Technical Specification Group Services and System Aspects; Study on Enhancement to the 5GC LoCation Services (Release 16)", 3GPP Standard; Technical Report; 3GPP TR 23.731, 3rd Generation Partnership Project (3GPP), Mobile Competence Centre; 650. Route Des Lucioles; F-06921 Sophia-Antipolis Cedex; France, vol. SA WG2, No. V16.0.0, Dec. 19, 2018 (Dec. 19, 2018), pp. 1-170, XP051591219.

(Continued)

*Primary Examiner* — Adolf Dsouza
(74) *Attorney, Agent, or Firm* — Slater Matsil, LLP

(57) ABSTRACT

A first network element is disposed in the campus network, and a second network element is determined for each terminal device. The first network element stores a correspondence between each terminal device and a second network element corresponding to the terminal device. After receiving a positioning message reported by a first terminal device, the first network element may route, based on the pre-stored correspondence, the positioning message to a second network element corresponding to the first terminal device.

20 Claims, 8 Drawing Sheets

(56) References Cited

OTHER PUBLICATIONS

"3rd Generation Partnership Project; Technical Specification Group Services and System Aspects; 5G System (5GS) Location Services (LCS); Stage 2 (Release 16)", 3GPP Standard; Technical Specification; 3GPP TS 23.273, 3rd Generation Partnership Project (3GPP), Mobile Competence Centre; 650. Route Des Lucioles; F-06921, Sophia-Antipolis Cedex; France, No. V16.4.0 Jul. 9, 2020 (Jul. 9, 2020), pp. 1-96, XP051924373.

* cited by examiner

POSITIONING METHOD AND APPARATUS

CROSS-REFERENCE TO RELATED APPLICATIONS

This application is a continuation of International Application No. PCT/CN2022/089314, filed on Apr. 26, 2022, which claims priority to Chinese Patent Application No. 202110540425.1, filed on May 18, 2021. The disclosures of the aforementioned applications are hereby incorporated by reference in their entireties.

TECHNICAL FIELD

This application relates to the field of communication technologies, and in particular, to a positioning method and an apparatus.

BACKGROUND

Application of a 5th generation (5G) communication technology to campus networks (for example, an enterprise network, a school campus network, and the like) is a current hot trend. One of 5G technologies used by the campus networks is to position and track a terminal device in a campus, especially position an indoor terminal device.

However, different from common terminal devices (for example, smartphones) in a 5G network, common terminal devices in the campus network are internet of things terminals (for example, electricity meters, sensors, and the like). Internet of things terminals are generally characterized by low power consumption and low costs, and usually do not have a complete communication function. As a result, a positioning procedure for a terminal device in the 5G network is not applicable to the campus networks.

Therefore, how to position a terminal device in the campus networks is an urgent technical problem to be resolved.

SUMMARY

Embodiments of this application provide a positioning method and an apparatus, to position a terminal device in a campus network.

According to a first aspect, a positioning method is provided. The method may be performed by a first network element or a chip in a first network element. For example, the method is performed by the first network element. The method includes: The first network element receives a first message from a second network element, where the first message includes a first correspondence between an identifier of a first terminal device and an identifier of the second network element; the first network element stores the first correspondence; the first network element receives a second message from one or more access network devices, where the second message includes the identifier of the first terminal device and a measurement result for a positioning signal sent by the first terminal device; and the first network element forwards the second message to the second network element based on the first correspondence and the identifier of the first terminal device included in the second message.

In this embodiment of this application, the fixed second network element is configured for the first terminal device in a campus network, and the configuration information (that is, the first correspondence between the identifier of the first terminal device and the identifier of the second network element) is stored in the first network element. When the first terminal device reports a positioning message (for example, the second message), the first network element may route, based on the first correspondence, the positioning message of the first terminal device to the second network element corresponding to the first terminal device. This can implement positioning for the terminal device in the campus network.

In a possible design, the second message further includes a positioning parameter of the first terminal device. For example, the second message may carry one or more of the following: a positioning capability of the first terminal device, a positioning method of the first terminal device, positioning precision of the first terminal device, a positioning frequency of the first terminal device, and a notification address of a positioning result of the first terminal device.

In this way, a network can be assisted in positioning the first terminal device, to meet a positioning requirement of the first terminal device as much as possible.

In a possible design, the positioning parameter is an encryption and/or integrity protected parameter.

In this way, only a network element (for example, the second network element) having a decryption parameter and/or an integrity protection parameter can obtain the positioning parameter. This avoids leakage or tampering of the positioning parameter in a network transmission process, and improves positioning security.

In a possible design, the first network element establishes a signaling connection to each of the one or more access network devices. It should be understood that the signaling connection is a signaling connection (for example, an NG-AP connection) at a device granularity, that is, establishment of the connection is not related to a terminal device (user).

In this way, the first network element and the access network device can communicate with each other without perceiving a terminal device (user).

In a possible design, a network element type of the first network element is AMF, a network element type of the second network element is AMF, and a network element type of a third network element is LMF. It should be understood that the first network element and the second network element are of a same type, but are not a same network element. Optionally, the first network element is a default AMF.

According to a second aspect, a positioning method is provided. The method may be performed by a second network element or a chip in a second network element. For example, the method is performed by the second network element. The method includes: The second network element creates a context of a first terminal device, where the context includes an identifier of the first terminal device; the second network element sends a first message to a first network element, where the first message includes a first correspondence between the identifier of the first terminal device and an identifier of the second network element; the second network element receives a second message from the first network element, where the second message is sent by the first network element to the second network element based on the first correspondence, and the second message includes the identifier of the first terminal device and a measurement result for a positioning signal sent by the first terminal device; and the second network element sends the measurement result in the second message to a third network element, where the third network element is configured to determine position information of the first terminal device based on the measurement result.

According to a third aspect, a positioning method is provided. The method may be performed by an access network device or a chip in an access network device. For example, the method is performed by the access network device. The method includes: The access network device receives a positioning signal sent by a first terminal device, measures the positioning signal to obtain a measurement result, and receives a third message sent by the first terminal device, where the third message includes an identifier of the first terminal device; and the access network device generates a second message based on the measurement result and the third message, and sends the second message to a first network element, where the second message includes the identifier of the first terminal device and the measurement result.

According to a fourth aspect, a positioning method is provided. The method may be performed by a first terminal device or a chip in a first terminal device. For example, the method is performed by the first terminal device. The method includes: The first terminal device sends a positioning signal; and the first terminal device sends a third message, where the third message includes an identifier of the first terminal device.

Optionally, the first terminal device sends the positioning signal and the third message in a broadcast manner.

For implementations and beneficial effects of the second aspect to the fourth aspect, refer to the implementations and beneficial effects of the first aspect. Details are not described herein again.

According to a fifth aspect, a positioning method is provided. The method may be performed by an access network device or a chip in an access network device. For example, the method is performed by a second network element. The method includes: The access network device receives a fourth message from a second network element, where the fourth message includes a second correspondence between an address of the second network element and an identifier of the second network element; the access network device receives a positioning signal sent by a first terminal device, measures the positioning signal to obtain a measurement result, and receives an eighth message sent by the first terminal device, where the eighth message includes an identifier of the first terminal device and the identifier of the second network element; and the access network device sends a sixth message to the second network element based on the identifier of the second network element in the eighth message and the second correspondence, where the sixth message includes the identifier of the first terminal device and the measurement result.

In this embodiment of this application, the fixed second network element is configured for the first terminal device in a campus network. When reporting a positioning message (which is a message related to terminal device positioning, for example, the eighth message), the first terminal device uses the positioning message to carry the identifier of the second network element corresponding to the first terminal device, so that the access network device can route, based on the identifier of the second network element, the positioning message to the second network element corresponding to the first terminal device. This can implement positioning for the terminal device in the campus network.

In a possible design, the eighth message further includes a positioning parameter of the first terminal device. For example, the eighth message carries one or more of the following: a positioning capability of the first terminal device, a positioning method of the first terminal device, positioning precision of the first terminal device, a positioning frequency of the first terminal device, and a notification address of a positioning result of the first terminal device.

In this way, a network can be assisted in positioning the first terminal device, to meet a positioning requirement of the first terminal device as much as possible.

In a possible design, the positioning parameter is an encryption and/or integrity protected parameter.

In this way, only a network element (for example, a third network element) having a decryption parameter and/or an integrity protection parameter can obtain the positioning parameter. This avoids leakage or tampering of the positioning parameter in a network transmission process, and improves positioning security.

In a possible design, the second network element has a signaling connection to each of the one or more access network devices. It should be understood that the signaling connection is a signaling connection (for example, an NG-AP connection) at a device granularity, that is, establishment of the connection is not related to a terminal device (user).

In this way, the second network element and the access network device can communicate with each other without perceiving a terminal device (user).

In a possible design, the second network element is an AMF, and the third network element is an LMF.

According to a sixth aspect, a positioning method is provided. The method may be performed by a second network element or a chip in a second network element. For example, the method is performed by the second network element. The method includes: The second network element sends a fourth message to one or more access network devices, where the fourth message includes a second correspondence between an address of the second network element and an identifier of the second network element; the second network element receives a fifth message from a third network element, where the fifth message includes a third correspondence between an identifier of a first terminal device and an identifier of the third network element; the second network element stores the third correspondence; the second network element receives a sixth message from the one or more access network devices, where the sixth message includes the identifier of the first terminal device and a measurement result for a positioning signal sent by the first terminal device, and the sixth message is sent by the access network device to the second network element based on the second correspondence; and the second network element sends a seventh message to the third network element based on the third correspondence and the identifier of the first terminal device in the sixth message, where the seventh message includes the measurement result, and the third network element is configured to determine position information of the first terminal device based on the measurement result.

According to a seventh aspect, a positioning method is provided. The method may be performed by a third network element or a chip in a third network element. For example, the method is performed by the third network element. The method includes: The third network element creates a context of a first terminal device, where the context includes an identifier of the first terminal device; the third network element sends a fifth message to a second network element, where the fifth message includes a third correspondence between the identifier of the first terminal device and an identifier of the third network element; the third network element receives a seventh message from the second network element, where the seventh message includes a measurement result for a positioning signal sent by the first terminal device, and the seventh message is sent by the second network element to the third network element based on the third correspondence; and the third network element determines position information of the first terminal device based on the measurement result.

According to an eighth aspect, a positioning method is provided. The method may be performed by a first terminal device or a chip in a first terminal device. For example, the method is performed by the first terminal device. The method includes: The first terminal device sends a positioning signal; and the first terminal device sends an eighth message, where the eighth message includes an identifier of the first terminal device and an identifier of a second network element.

Optionally, the first terminal device sends the positioning signal and the eighth message in a broadcast manner.

For implementations and beneficial effects of the sixth aspect to the eighth aspect, refer to the implementations and beneficial effects of the fifth aspect. Details are not described herein again.

According to a ninth aspect, a positioning apparatus is provided. The apparatus is located in a first network element, and the apparatus includes modules/units configured to perform the method steps in any one of the first aspect or the possible designs of the first aspect.

For example, the apparatus includes a communication module and a processing module. The communication module is used by the first network element to communicate with another network element. The processing module is configured to: receive a first message from a second network element using the communication module, where the first message includes a first correspondence between an identifier of a first terminal device and an identifier of the second network element; store the first correspondence; receive a second message from one or more access network devices using the communication module, where the second message includes the identifier of the first terminal device and a measurement result for a positioning signal sent by the first terminal device; and forward the second message to the second network element using the communication module based on the first correspondence and the identifier of the first terminal device included in the second message.

According to a tenth aspect, a positioning apparatus is provided. The apparatus is located in a second network element, and the apparatus includes modules/units configured to perform the method steps in any one of the second aspect or the possible designs of the second aspect.

For example, the apparatus includes a communication module and a processing module. The communication module is used by the second network element to communicate with another network element. The processing module is configured to: create a context of a first terminal device, where the context includes an identifier of the first terminal device; send a first message to a first network element using the communication module, where the first message includes a first correspondence between the identifier of the first terminal device and an identifier of the second network element; receive a second message from the first network element using the communication module, where the second message is sent by the first network element to the second network element based on the first correspondence, and the second message includes the identifier of the first terminal device and a measurement result for a positioning signal sent by the first terminal device; and send the measurement result in the second message to a third network element using the communication module, where the third network element is configured to determine position information of the first terminal device based on the measurement result.

According to an eleventh aspect, a positioning apparatus is provided. The apparatus is located in an access network device, and the apparatus includes modules/units configured to perform the method steps in any one of the third aspect or the possible designs of the third aspect.

For example, the apparatus includes a communication module and a processing module. The communication module is used by the access network device to communicate with another network element or device. The processing module is configured to: receive, using the communication module, a positioning signal sent by a first terminal device; measure the positioning signal to obtain a measurement result; receive, using the communication module, a third message sent by the first terminal device, where the third message includes an identifier of the first terminal device; generate a second message based on the measurement result and the third message; and send the second message to a first network element using the communication module, where the second message includes the identifier of the first terminal device and the measurement result for the first terminal device.

According to a twelfth aspect, a positioning apparatus is provided. The apparatus is located in a first terminal device, and the apparatus includes modules/units configured to perform the method steps in any one of the fourth aspect or the possible designs of the fourth aspect.

For example, the apparatus includes a communication module and a processing module. The communication module is used by the first terminal device to communicate with another network element or device. The processing module is configured to: generate a positioning signal and a third message; and send the positioning signal and the third message using the communication module, where the third message includes an identifier of the first terminal device.

According to a thirteenth aspect, a positioning apparatus is provided. The apparatus is located in an access network device, and the apparatus includes modules/units configured to perform the method steps in any one of the fifth aspect or the possible designs of the fifth aspect.

For example, the apparatus includes a communication module and a processing module. The communication module is used by the access network device to communicate with another network element or device. The processing module is configured to: receive a fourth message from a second network element using the communication module, where the fourth message includes a second correspondence between an address of the second network element and an identifier of the second network element; receive, using the communication module, a positioning signal sent by a first terminal device; measure the positioning signal to obtain a measurement result; receive, using the communication module, an eighth message sent by the first terminal device, where the eighth message includes an identifier of the first terminal device and the identifier of the second network element; and send a sixth message to the second network element using the communication module based on the identifier of the second network element in the eighth message and the second correspondence, where the sixth message includes the identifier of the first terminal device and the measurement result.

According to a fourteenth aspect, a positioning apparatus is provided. The apparatus is located in a second network element, and the apparatus includes modules/units configured to perform the method steps in any one of the sixth aspect or the possible designs of the sixth aspect.

For example, the apparatus includes a communication module and a processing module. The communication module is used by the second network element to communicate with another network element. The processing module is configured to: send a fourth message to one or more access network devices using the communication module, where the fourth message includes a second correspondence between an address of the second network element and an identifier of the second network element; receive a fifth message from a third network element using the communication module, where the fifth message includes a third correspondence between an identifier of a first terminal device and an identifier of the third network element; store the third correspondence; receive a sixth message from the one or more access network devices using the communication module, where the sixth message includes the identifier of the first terminal device and a measurement result of the at least one access network device for a positioning signal sent by the first terminal device, and the sixth message is sent by the access network device to the second network element based on the second correspondence; and send a seventh message to the third network element using the communication module based on the third correspondence and the identifier of the first terminal device in the sixth message, where the seventh message includes the measurement result, and the third network element is configured to determine position information of the first terminal device based on the measurement result.

According to a fifteenth aspect, a positioning apparatus is provided. The apparatus is located in a third network element, and the apparatus includes modules/units configured to perform the method steps in any one of the seventh aspect or the possible designs of the seventh aspect.

For example, the apparatus includes a communication module and a processing module. The communication module is used by the third network element to communicate with another network element. The processing module is configured to: create a context of a first terminal device, where the context includes an identifier of the first terminal device; send a fifth message to a second network element using the communication module, where the fifth message includes a third correspondence between the identifier of the first terminal device and an identifier of the third network element; receive a seventh message from the second network element using the communication module, where the seventh message includes the identifier of the first terminal device and a measurement result for a positioning signal sent by the first terminal device, and the seventh message is sent by the second network element to the third network element based on the third correspondence; and determine position information of the first terminal device based on the measurement result.

According to a sixteenth aspect, a positioning apparatus is provided. The apparatus is located in a first terminal device, and the apparatus includes modules/units configured to perform the method steps in any one of the eighth aspect or the possible designs of the eighth aspect.

For example, the apparatus includes a communication module and a processing module. The communication module is used by the first terminal device to communicate with another network element or device. The processing module is configured to: generate a positioning signal and an eighth message; and send the positioning signal and the eighth message using the communication module, where the eighth message includes an identifier of the first terminal device and an identifier of a second network element.

According to a seventeenth aspect, a positioning apparatus is provided, including: at least one processor, and a memory and a communication interface that are communicatively connected to the at least one processor. The memory stores instructions that can be executed by the at least one processor, and the at least one processor executes the instructions stored in the memory, so that the apparatus performs the method in any one of the first aspect to the eighth aspect by using the communication interface.

According to an eighteenth aspect, a computer-readable storage medium is provided, including a program or instructions. When the program or the instructions are run on a computer, the method in any one of the first aspect to the eighth aspect is performed.

According to a nineteenth aspect, a computer program product is provided, including instructions. When the computer program product runs on a computer, the method in any one of the first aspect to the eighth aspect is performed.

According to a twentieth aspect, a chip is provided. The chip is coupled to a memory, and is configured to read and execute program instructions stored in the memory, so that the method in any one of the first aspect to the eighth aspect is performed.

According to a twenty-first aspect, a communication system is provided, including:

- a first network element, configured to perform the method according to the first aspect;
- a second network element, configured to perform the method according to the second aspect;
- an access network device, configured to perform the method according to the third aspect; and
- a terminal device, configured to perform the method according to the fourth aspect.

According to a twenty-second aspect, a communication system is provided, including:

- an access network device, configured to perform the method according to the fifth aspect;
- a second network element, configured to perform the method according to the sixth aspect;
- a third network element, configured to perform the method according to the seventh aspect; and
- a terminal device, configured to perform the method according to the eighth aspect.

DETAILED DESCRIPTION OF ILLUSTRATIVE EMBODIMENTS

Terms “system” and “network” in embodiments of this application may be used interchangeably. “At least one”

means one or more, and "a plurality of" means two or more. The term "and/or" describes an association relationship of associated objects, and indicates that three relationships may exist. For example, A and/or B may indicate the following three cases: Only A exists, both A and B exist, and only B exists. A and B may be singular or plural. The character "/" usually indicates an "or" relationship between the associated objects. "At least one of the following items (pieces)" or a similar expression thereof refers to any combination of these items, including a single item (piece) or any combination of a plurality of items (pieces). For example, at least one of a, b, or c may indicate a, b, c, a and b, b and c, a and c, or a, b, and c.

In addition, unless otherwise specified, ordinal numbers such as "first" and "second" in embodiments of this application are used to distinguish between a plurality of objects, and are not used to limit a sequence, a time sequence, priorities, or importance of the plurality of objects. For example, a first priority criterion and a second priority criterion are merely used to distinguish between different criteria, but do not indicate different content, priorities, importance, or the like of the two criteria.

In addition, terms "include" and "have" in embodiments, claims, and accompanying drawings of this application are not exclusive. For example, a process, method, system, product, or device including a series of steps or modules is not limited to the listed steps or modules, and may further include steps or modules that are not listed.

Figure 1:
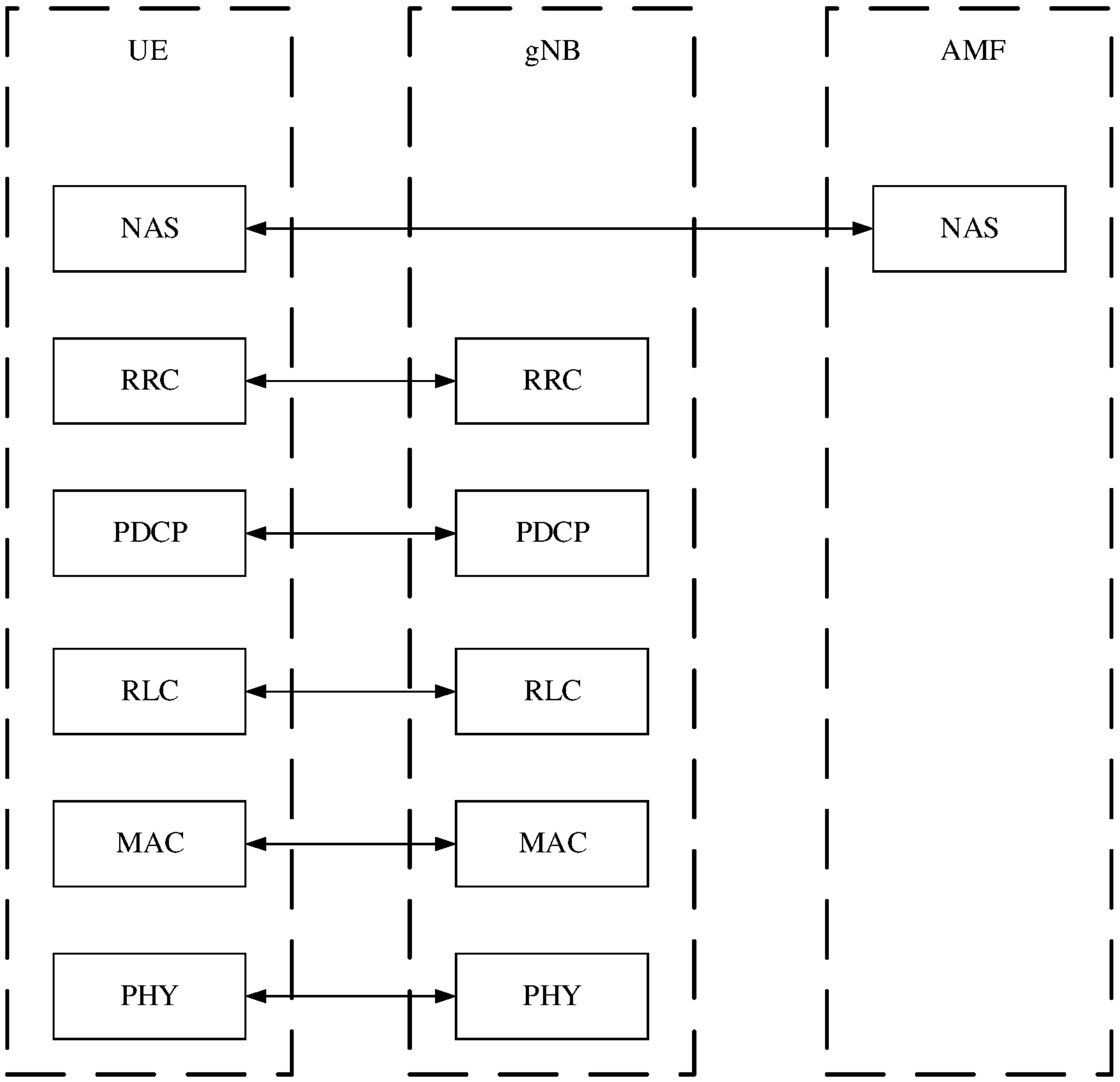
FIG. 1 is a schematic diagram of communication protocol stacks of UE and a network device in a 5G network.

FIG. 1 is a schematic diagram of communication protocol stacks of user equipment (UE) and a network device in a 5th generation (5G) network. A communication protocol stack of the UE successively includes a non-access stratum (NAS), a radio resource control (RRC) layer, a packet data convergence protocol (PDCP) layer, a radio link control (RLC) layer, a media access control (MAC) layer, a physical (PHY) layer, and the like from top to bottom. A communication protocol stack of a radio access network (RAN) device successively includes an RRC layer, a PDCP layer, an RLC layer, a MAC layer, a PHY layer, and the like from top to bottom. A communication protocol stack of an access and mobility management function (AMF) includes a NAS layer and the like. For ease of description, the "RAN device" may be referred to as a "RAN" for short below.

Figure 2:
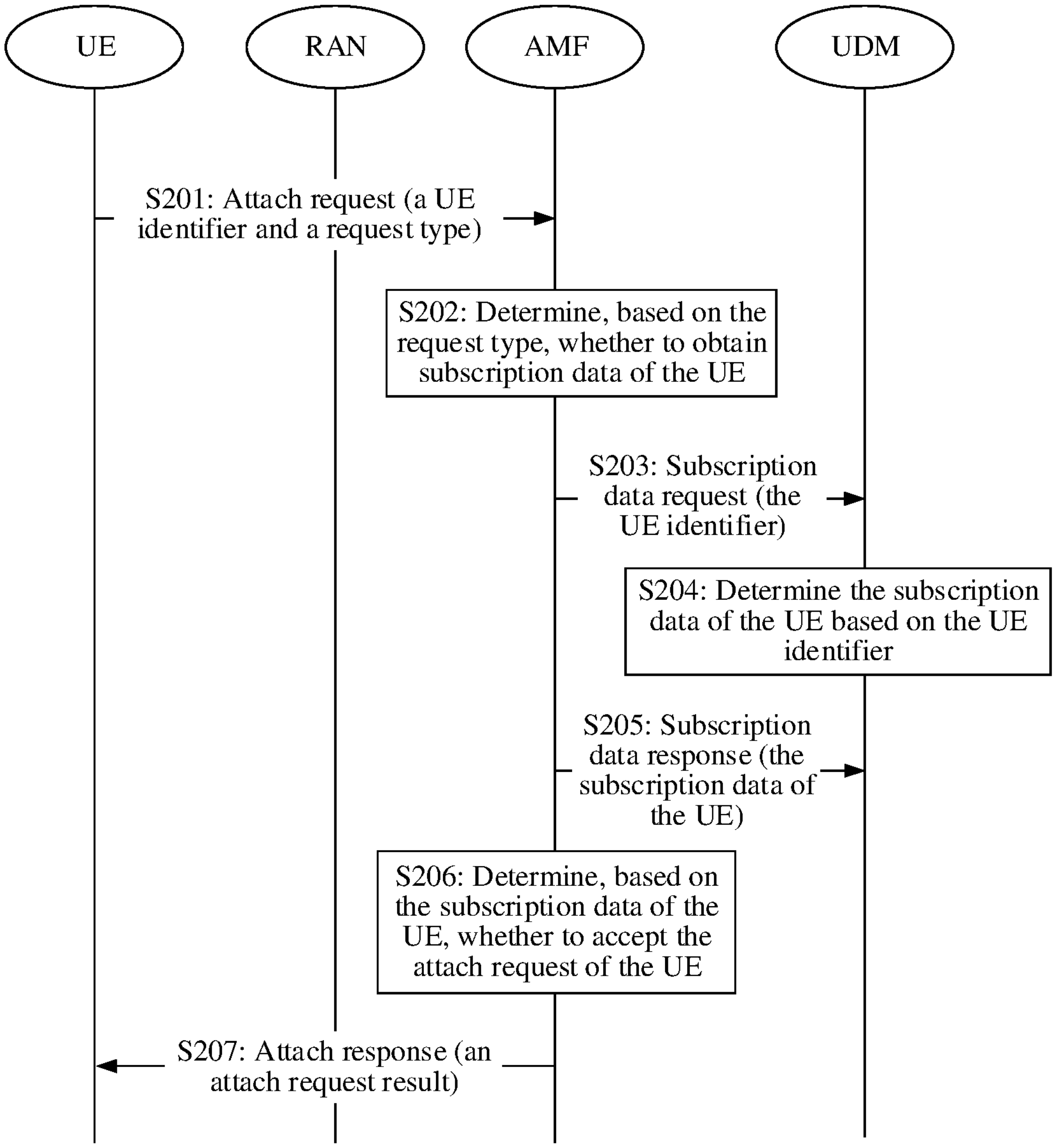
FIG. 2 is a schematic flowchart of accessing a 5G network by UE in the 5G network based on the protocol stack shown in FIG. 1.

FIG. 2 is a schematic flowchart of accessing a 5G network by UE in the 5G network based on the protocol stack shown in FIG. 1.

S201: The UE sends an attach request message (NAS message) to an AMF, and the AMF receives the attach request message.

Specifically, the UE first sends the attach request message to a RAN (for example, a next generation NodeB (gNB) or a next generation evolved NodeB (ng-eNB)). A message type of the attach request message is NAS message, and the attach request message carries a UE identifier, a request type, a UE capability, and other information. After the RAN receives the attach request message sent by the UE, the RAN adds current position information of the UE, that is, a cell identifier (cell ID). Then, the RAN forwards the attach request message to the AMF, and provides the current position information of the UE for the AMF.

S202: After receiving the attach request message, the AMF determines, based on the request type carried in the attach request message, whether to obtain subscription data of the UE.

It should be understood that after receiving the attach request message and the position information (that is, the cell ID) provided by the RAN, the AMF further creates a context for the UE. The context of the UE stores the UE identifier, a UE position, the UE capability, and other information.

S203: The AMF requests the subscription data of the UE from a unified data management (UDM), where the request message carries the UE identifier.

S204: The UDM determines the subscription data of the UE based on the UE identifier.

S205: The UDM sends a subscription data response message to the AMF, where the message carries the subscription data of the UE.

S206: The AMF determines, based on the subscription data of the UE, whether to accept the attach request of the UE.

S207: The AMF sends an attach response message to the UE, where the attach response message carries an attach request result.

If the AMF accepts the attach request of the UE, the AMF includes a tracking area allocated to the UE in the attach response message sent to the UE. The tracking area is an area in which the UE is allowed to move in the area without notifying a network of a specific position. Once the UE leaves the area, the UE initiates a registration request to the network again.

After the UE accesses the network, the network can provide various services for the UE, such as a location service (LCS). The LCS is a capability of a 5G network. A positioning capability of the 5G network is to measure a transmitted signal of the UE by using a mobile communication base station (for example, a gNB or an NG-RAN), and calculate a position of the UE. The UE (for example, a smartphone) in the 5G network supports a plurality of positioning scenarios such as an emergency service (for example, no alarm), a commercial service (for example, an application (APP) wants to know a user position), and the like.

Figure 3:
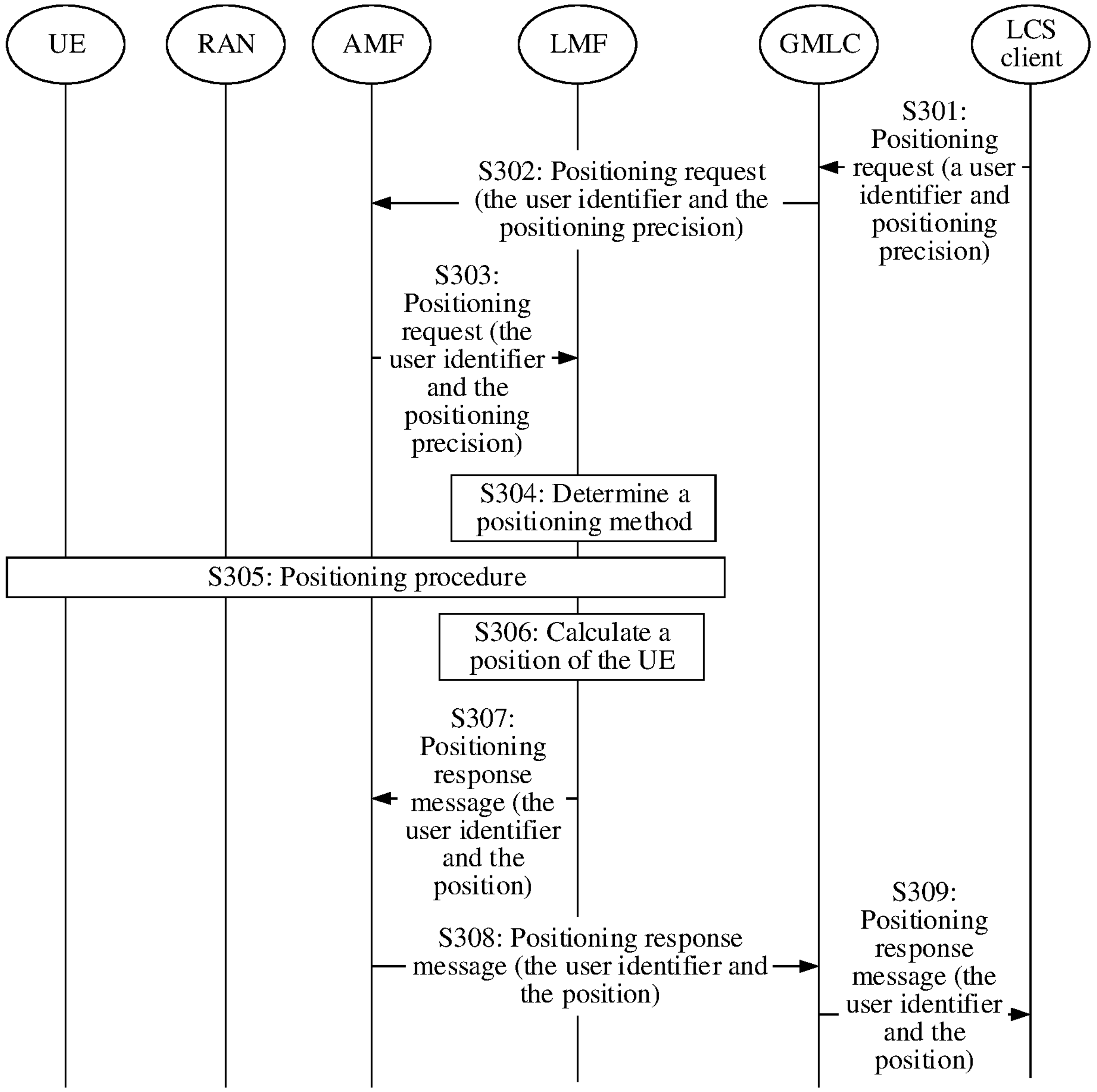
FIG. 3 is a schematic flowchart of performing positioning on UE in a 5G network.

FIG. 3 is a schematic flowchart of performing positioning on UE by a 5G network after the UE accesses the 5G network.

S301: An LCS client sends a positioning request message to a gateway mobile location center (GMLC), where the positioning request message carries a user identifier, positioning precision, and the like of the UE.

S302: The GMLC authorizes a positioning request of the LCS client, and forwards the positioning request message to an AMF.

S303: The AMF checks subscription data of the UE, and after determining that positioning on the UE can be performed, the AMF sends a positioning request to a location management function (LMF).

S304: The LMF determines a positioning method based on the positioning precision.

S305: The LMF performs a positioning procedure, where the positioning procedure relates to interaction with the UE, a RAN, and the like.

Specifically, the LMF sends an identifier or an address of the LMF and the identifier of the UE to the AMF, and the AMF further sends the identifier or the address of the LMF and the identifier of the UE to the RAN. Because the RAN locally stores a context of the UE, the RAN may determine the positioned UE based on the UE identifier, and then measure an uplink signal or a downlink signal of the UE. After collecting a measurement signal of the UE, the RAN reports the measurement signal to an address configured by the LMF.

S306: The LMF calculates a position of the UE based on the measurement signal.

S307: The LMF sends a positioning response message to the AMF, where the positioning response message carries the user identifier of the UE and the position of the UE.

S308: The AMF sends a positioning response message to the GMLC, where the positioning response message carries the user identifier of the UE and the position of the UE.

S309: The GMLC sends a positioning response message to the GMLC, where the positioning response message carries the user identifier of the UE and the position of the UE.

It can be learned from the procedures in FIG. 2 and FIG. 3 that the protocol stack of the UE in the 5G network is a full protocol stack defined based on the 3rd generation partnership project (3GPP). Therefore, the UE may implement network access and positioning by directly communicating with the AMF.

Application of a 5G technology to a campus network (or referred to as a local network) is one of current hot trends. The campus network is a network covering a specific partial area, for example, a network covering a place such as an enterprise campus, a school campus, an airport, a railway station, a large shopping center, a stadium, or the like. UE may access a local gateway through a radio access network, to directly access a corresponding local network. This avoids accessing an external data network, and therefore reduces an application access delay and bandwidth of a backbone network. For example, live VR broadcast is provided in a stadium, campus communication is provided in a campus for accessing a learning resource in the campus, industrial control communication is provided in an enterprise campus, local shopping discount push and real-time position navigation are provided in a mall, and the like.

One of 5G technologies used by the campus network is to position and track a terminal device in a campus, especially position an indoor terminal device. However, indoor services are complex. For example, a commercial indoor product is expected to be used in a one-stop process of parking, navigation, payment, shopping, and vehicle pickup for a customer, and further play a role of consumption guidance in some business scenarios. An indoor application in a medical scenario needs to involve functions such as navigation, registration, queuing, and service handling for a user. This requires that an indoor map application has a high integration capability or functions covered by a system are wider than those of a conventional application. Therefore, a product needs to be intelligent, a data presentation form needs to be more flexible, and data delivery needs to be more accurate.

In the campus network, common terminals to be positioned are not necessarily common UEs (for example, smartphones of users) in a 5G network. For example, internet of things (Internet of Things, IoT) terminals (for example, electricity meters, sensors, and the like) are common in the campus network. However, the IoT terminals are generally characterized by a simple function, and some IoT terminals even have no communication power consumption but have only a positioning capability. In this way, power consumption of the terminals can be reduced, and a service life of the terminals can be increased. For example, a communication protocol stack of the IoT terminal lacks at least a NAS layer and an RRC layer. Therefore, the IoT terminal cannot directly communicate with an AMF. Therefore, in the campus network, a network access procedure (for example, the procedure shown in FIG. 2) in a 5G technology cannot be used to connect a terminal to a network. Further, because the terminal cannot access the network, the network naturally cannot configure a positioning service parameter for the terminal. For example, the terminal cannot establish a connection to a RAN side to send directional data, and the RAN has no network management device information, a UE context, or the like of the terminal. When an LMF needs to position the terminal, the RAN cannot implement routing to the terminal. Therefore, in the campus network, a positioning procedure (for example, the procedure shown in FIG. 3) in a 5G technology cannot be used to position the terminal.

In view of this, embodiments of this application provide a positioning method and an apparatus, to connect PUE in a campus network to a network and position the PUE.

The following describes the technical solutions in embodiments of this application in detail with reference to the accompanying drawings.

Embodiments of this application may be applied to a scenario in which positioning needs to be performed on a terminal device in a campus network, for example, real-time tracking and positioning for the terminal device, historical track tracking of the terminal device, warning of a restricted area, proactive help seeking, and the like.

Figure 4:
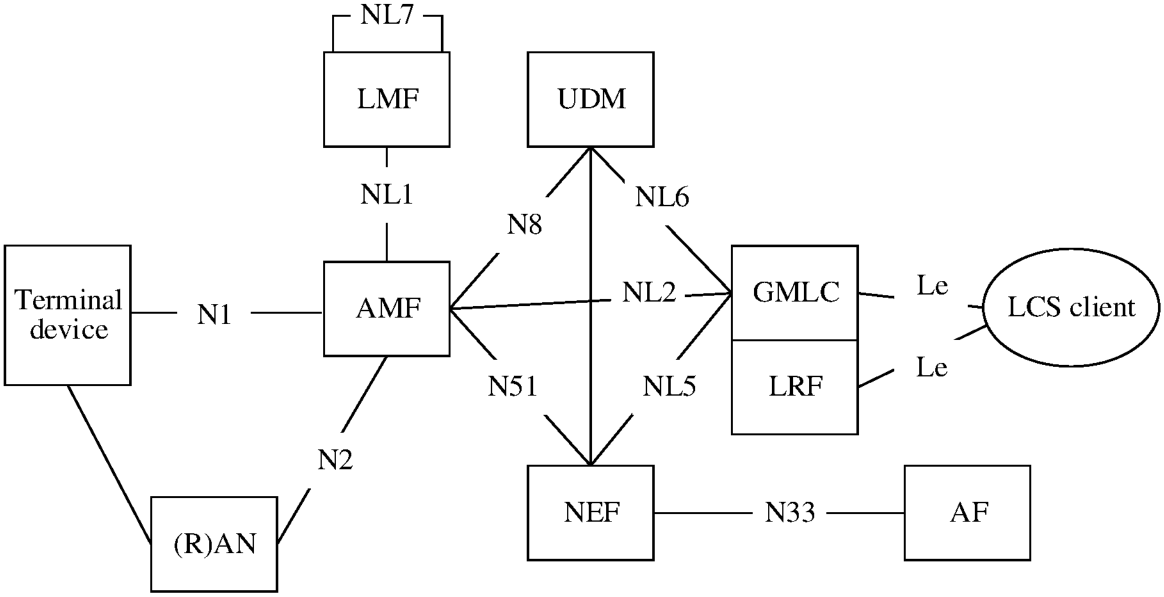
FIG. 4 is a schematic diagram of a network architecture to which an embodiment of this application is applicable.

FIG. 4 is a schematic diagram of a network architecture to which an embodiment of this application is applicable. The network includes a terminal device, a RAN, an AMF, an LMF, a GMLC, a network exposure function (NEF), an application function (AF), a UDM, and the like.

(1) The terminal device (or referred to as a terminal for short) includes the foregoing terminal that does not have a complete communication function (that is, a terminal that does not have a full protocol stack defined by 3GPP), for example, PUE that supports neither of a NAS protocol and an RRC protocol. Specifically, for example, the terminal device may be an IoT device such as an electricity meter, a sensor, a barcode, radio frequency identification (RFID), a laser scanner, a global positioning system (GPS), or the like.

It should be noted that, although embodiments of this application are used to resolve a problem of network access and positioning of a terminal that does not have a complete communication function in a campus network, the same technical solution is also applicable to common UE (for example, a smartphone). Therefore, the terminal device may further include a terminal having a complete communication function (that is, a terminal having a full protocol stack defined by 3GPP). For example, the terminal device includes a device that provides a voice and/or data connectivity for a user. Specifically, the terminal device includes a device that provides the voice for the user, includes a device that provides the data connectivity for the user, or includes a device that provides the voice and the data connectivity for the user. For example, the terminal device may be a mobile phone (or referred to as a "cellular" phone), a computer having a mobile terminal device, a portable, pocket-sized, handheld, or computer built-in mobile apparatus, or the like.

Because this specification mainly relates to a terminal device that needs to be positioned, the terminal device in this specification may also be collectively referred to as a positioning terminal (PUE). The PUE may be a terminal with a SIM card issued by an operator. After being powered on, the PUE needs to access an operator network. The operator network senses device information, such as a device identifier, a device position, and a device capability, to manage the PUE. The PUE may include the foregoing terminal having no complete communication function (or a terminal having no full protocol stack defined by 3GPP) (for example, an IoT terminal) and the foregoing terminal having a complete communication function (or a terminal having a full protocol stack defined by 3GPP) (for example, a mobile phone). It should be understood that the following "terminal device" and the "PUE" may be replaced with each other.

(2) The RAN is mainly responsible for collecting a reference signal (SRS) of a terminal device, and reporting the reference signal to an LMF.

The RAN includes, for example, a base station (for example, an access point), and may be a device that communicates with a wireless terminal device over an air interface in an access network by using one or more cells. The network device may be configured to mutually convert a received over-the-air frame and an internet protocol (IP) packet and serve as a router between the terminal device and a rest portion of the access network, where the rest portion of the access network may include an IP network. The network device may further coordinate attribute management of the air interface. For example, the network device may include an evolved NodeB (NodeB or eNB or e-NodeB, evolved NodeB) in a long term evolution (LTE) system or an LTE-advanced (LTE-A) system, or may include a next generation NodeB (gNB) in a 5th generation (5G) new radio (NR) system. This is not limited in embodiments of this application.

In some implementations, the base station may include two parts: a baseband unit (BBU) and an active antenna unit (AAU). The BBU provides an external interface for connecting to a transmission device, a radio frequency module, a base station signal source, an external clock source, and a network management device, to implement functions such as signal transmission, automatic upgrade of base station software, clock receiving, and the like; and manages an entire base station system in a centralized manner, to implement functions such as uplink and downlink data processing, signaling processing, resource management, operation and maintenance, and the like. One BBU is connected to at least one AAU. The AAU is a combination of a radio frequency unit and an antenna, provides signal transfer and conversion between the BBU and the antenna, and provides an antenna function, a remote electrical tilt function, an installation slot, an interface, and the like. One AAU is provided with one or more TRPs.

In a network architecture, a network device may include a central unit (CU), a distributed unit (DU), or a radio access network device including a CU and a DU. In a base station architecture in which a CU and a DU are separated, one base station may include one CU and one or more DUs. Further, one CU may include one central unit control plane (CU-CP) and one or more central unit user planes (CU-UP). Function division of the CU and the DU may include but is not limited to division based on a protocol stack. In a possible manner, a radio resource control (RRC) layer, a packet data convergence protocol (PDCP) layer, and a service data adaptation protocol (SDAP) layer are deployed on the CU. A radio link control (RLC) layer, a media access control (MAC) layer, and a physical layer (PHY) are deployed on the DU. Correspondingly, the CU has an RRC processing capability, a PDCP processing capability, and an SDAP processing capability, and the DU has an RLC processing capability, a MAC processing capability, and a PHY processing capability. It should be noted that the foregoing function division is only an example, and there may be another division manner. For example, the CU has an RRC processing capability, a PDCP processing capability, an RLC processing capability, and an SDAP processing capability, and the DU has a MAC processing capability and a PHY processing capability. For another example, the CU has an RRC processing capability, a PDCP processing capability, an RLC processing capability, an SDAP processing capability, and a partial MAC processing capability (for example, MAC header addition), and the DU has a PHY processing capability and a partial MAC processing capability (for example, scheduling). Names of the CU and the DU may change, and any access network node that can implement the foregoing functions may be considered as the CU and the DU in this application. The CU-CP has a control plane function of the CU, for example, an RRC processing capability and a control plane processing capability in PDCP. The CU-UP has a user plane function of the CU, for example, an SDAP processing capability and a user plane processing capability in PDCP. The CU and the DU are connected through an F1 interface. The CU-CP and the CU-UP may be connected through an E1 interface, the CU-CP and the DU may be connected through an F1 control plane interface (F1-C), and the CU-UP and the DU may be connected through an F1 user plane interface (F1-U).

(3) The LMF is mainly configured to calculate a position of a terminal device.

(4) The GMLC is mainly configured to connect an LMF and an LCS client.

(5) The NEF is mainly configured to provide a network function for a third-party application.

(6) The AF is mainly configured to request a specific capability from a network.

(7) The UDM is mainly configured to store subscription data of a terminal device.

(8) The AMF is mainly responsible for context management of a terminal device.

It should be understood that the foregoing network elements (such as the RAN, the LMF, the GMLC, the NEF, the AF, the UDM, the AMF, and the like) are merely examples but not limitations. An actual communication system may further include another type of network element. A quantity of network elements of each type is not limited in embodiments of this application. In addition, in a standard evolution process, names of the foregoing network elements may change, and functions performed by the network elements may be further split or combined. This is not limited in embodiments of this application.

Figure 5:
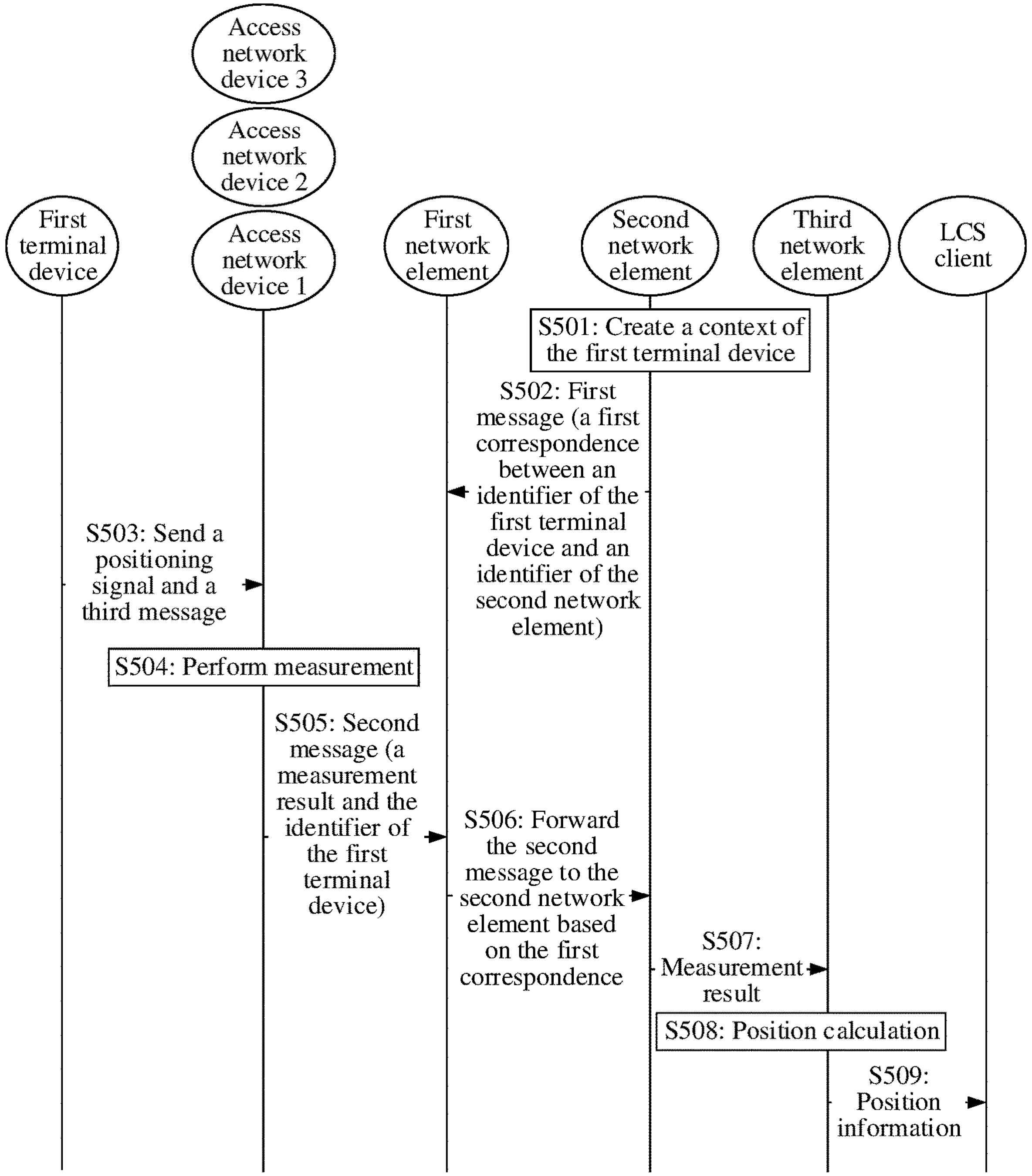
FIG. 5 is a flowchart of a positioning method according to an embodiment of this application.

FIG. 5 shows a positioning method according to an embodiment of this application. The method includes the following steps.

S501: A second network element creates a context of a first terminal device, where the context includes at least an identifier of the first terminal device.

The second network element is responsible for context management of the first terminal device. For example, the second network element is an AMF.

A coverage area of a campus network is not as wide as a coverage area of a 5G network, an activity area of a terminal device (for example, a robot) in the campus network is much smaller than an activity area of a terminal device (for example, a mobile phone) in the 5G network, and even most terminal devices (for example, an electricity meter, a sensor, and the like) in the campus network almost have no mobility. In view of the foregoing features of the campus network, in this embodiment of this application, a fixed second network element is allocated to each terminal device in the campus network, that is, each second network element serves a fixed terminal device. For example, each second network element provides a positioning service for a terminal device located in a preset range of the second network element. Further, a user may manually configure a context of each terminal device on a second network element to which the terminal device belongs.

For example, the second network element may receive the context of the first terminal device that is manually entered by a skilled person, and store the context of the first terminal device; or the second network element receives configuration information entered by a skilled person, and creates and stores the context of the first terminal device based on the configuration information. In this way, the second network element can create the context for the first terminal device without directly communicating with the first terminal device, to connect the first terminal device to the campus network. It should be understood that, that one second network element creates a context of one terminal device (that is, the first terminal device) is merely used as an example herein. In actual application, there may be a plurality of second network elements in the campus network, and each second network element may serve a plurality of terminal devices. Each second network element may create, in the foregoing manner, a context for each terminal device served by the second network element.

Optionally, the context of the first terminal device may further include a decryption parameter and/or an integrity protection parameter. After receiving a message from the first terminal device, the second network element may decrypt the message by using an encryption parameter in the context, and/or may verify integrity of the message by using the integrity protection parameter in the context.

Optionally, the identifier of the first terminal device may be a temporary identity (TID).

If a fixed identifier is always used for the first terminal device in a campus, that is, the identifier is fixed, a moving track of the first terminal device is tracked. Therefore, in this embodiment of this application, for each time of positioning on the first terminal device, the second network element generates a unique temporary identity for the first terminal device. After the current positioning procedure ends, the temporary identity becomes invalid. In this way, position privacy of the first terminal device can be protected.

Further, optionally, the context of the first terminal device includes a freshness parameter of the first terminal device, and the freshness parameter is used to update the temporary identity in the context of the first terminal device. Correspondingly, the first terminal device also stores the freshness parameter. In this way, it can be ensured that the first terminal device and the second network element synchronously update the temporary identity of the first terminal device.

Further, optionally, the context of the first terminal device may include a mobility management area of the first terminal device. The mobility management area includes a list of tracking areas (Tracking Area, TA), and indicates that when the first terminal device moves in an area indicated by the list, the first terminal device may not notify a network of a current specific TA of the first terminal device.

S502: The second network element sends a first message to a first network element, and the first network element receives the first message from the second network element, where the first message includes a first correspondence between the identifier of the first terminal device and an identifier of the second network element.

For ease of description, in this specification, the "first correspondence between the identifier of the first terminal device and the identifier of the second network element" may also be described as a "first correspondence between the first terminal device and the second network element".

The identifier of the second network element herein may be a device identifier of an AMF, for example, a MAC address, or may be an identifier specially used to route a positioning message (the positioning message is a positioning-related message) reported by the terminal device to the second network element, for example, an AMF routing identifier (AMF Routing ID). An identifier of each second network element in the campus network is unique.

It should be understood that if one second network element can simultaneously provide a positioning service for a plurality of terminal devices, the first network element may receive a correspondence between each of the plurality of terminal devices and the second network element from the second network element. In addition, if there are a plurality of second network elements in the campus network, the first network element may further receive correspondences between different second network elements and different terminal devices from the different second network elements.

In a possible design, for a correspondence between each terminal device and a second network element corresponding to the terminal device, the second network element corresponding to the terminal device separately sends a message to the first network element. For example, the first message may carry only the identifier of the first terminal device and the identifier of the second network element.

In another possible design, the second network element may send correspondences between the second network element and a plurality of terminal devices to the first network element together. For example, in addition to the identifier of the second network element and the identifier of the first terminal device, the first message may further carry an identifier of a second terminal device, an identifier of a third terminal device, and the like. The second terminal device, the third terminal device, and the first terminal device belong to a same second network element, that is, the second terminal device, the third terminal device, and the first terminal device correspond to a same second network element.

After receiving the first correspondence, the first network element stores the first correspondence. The first network element may determine, based on the first correspondence, that the first terminal device belongs to the second network element, or that the second network element provides a positioning service for the first terminal device.

In a possible design, the first network element may store, by using a mapping table, correspondences between a plurality of different terminal devices and second network elements corresponding to the plurality of different terminal devices. For example, the second network element is an AMF. Table 1 shows a plurality of correspondences. It can be learned from Table 1 that an AMF to which a terminal device UE 1 belongs is an AMF 1, an AMF to which a terminal device UE 2 belongs is an AMF 2, an AMF to which a terminal device UE 3 belongs is an AMF 3, an AMF to which a terminal device UE 4 belongs is the AMF 3, and the like.

TABLE 1

| Terminal device | Second network element (using an AMF as an example) |
|---|---|
| UE 1 | AMF 1 |
| UE 2 | AMF 2 |
| . . . | . . . |
| UE 3 | AMF 3 |
| UE 4 | AMF 3 |
| . . . | . . . |

The following describes the first network element in detail.

The first network element in this embodiment of this application can be communicatively connected to all second network elements in the campus network (that is, the first network element can communicate with all the second network elements in the campus network, for example, the first network element receives the first correspondence sent by the second network element). The first network element can further be communicatively connected to all RANs in the campus network (that is, the first network element can communicate with all the RANs in the campus network, for example, receive a measurement result reported by the RAN). The first network element can receive, through the RAN, a positioning message (the positioning message is a positioning-related message) sent by any terminal device in the campus network. After receiving a message from any terminal device, the first network element may route, based on a previously stored correspondence between the terminal device and a second network element corresponding to the terminal device, the message to the second network element corresponding to the terminal device.

It should be understood that there may be one or more first network elements in the campus network. This is not limited in this application. If there is one first network element, the first network element may receive messages sent by all terminal devices in the campus network. If there are a plurality of first network elements, the plurality of first network elements may communicate with each other, and each first network element knows a topology structure of the campus network. After a first network element receives a message of the first terminal device, if the first network element cannot directly communicate with the second network element corresponding to the first terminal device, the first network element may route the message of the first terminal device to another first network element according to the topology structure of the campus network, and the another first network element sends the message of the first terminal device to the second network element corresponding to the first terminal device. When there may be a plurality of first network elements, the plurality of first network elements may be considered as a whole, that is, the plurality of first network elements route, as a whole based on the first correspondence, the message of the first terminal device to the second network element corresponding to the first terminal device.

In a possible design, the first network element is one specified AMF in a plurality of AMFs in the campus network, for example, a default AMF. The default AMF can communicate with all other AMFs in the campus network and can communicate with all RANs in the campus network.

In another possible design, the first network element is a network element independently configured in the campus network, and is dedicated to performing a function performed by the first network element described in embodiments of this application.

S503: The first terminal device sends a positioning signal and a third message.

Optionally, the first terminal device sends the positioning signal and the third message in a broadcast manner.

It should be understood that the first terminal device first sends the positioning signal, and then sends the third message, where the third message includes the identifier of the first terminal device. Optionally, the third message further includes a positioning parameter of the first terminal device.

For example, the positioning signal may be a sounding reference signal (SRS), and the third message may be a long term evolution positioning protocol (LPP) message.

The positioning parameter may include one or more of the following: a positioning capability of the first terminal device, a positioning method of the first terminal device, positioning precision of the first terminal device, a positioning frequency of the first terminal device, a notification address of a positioning result of the first terminal device (for example, an address of an LCS client), and the like.

Certainly, when generating the third message, the first terminal device may further encrypt the third message by using an encryption parameter and/or perform integrity protection on the third message by using an integrity protection parameter.

S504: Each of one or more access network devices receives the positioning signal and the third message that are sent by the first terminal device, and each access network device measures the positioning signal to obtain a measurement result.

Figure 6:
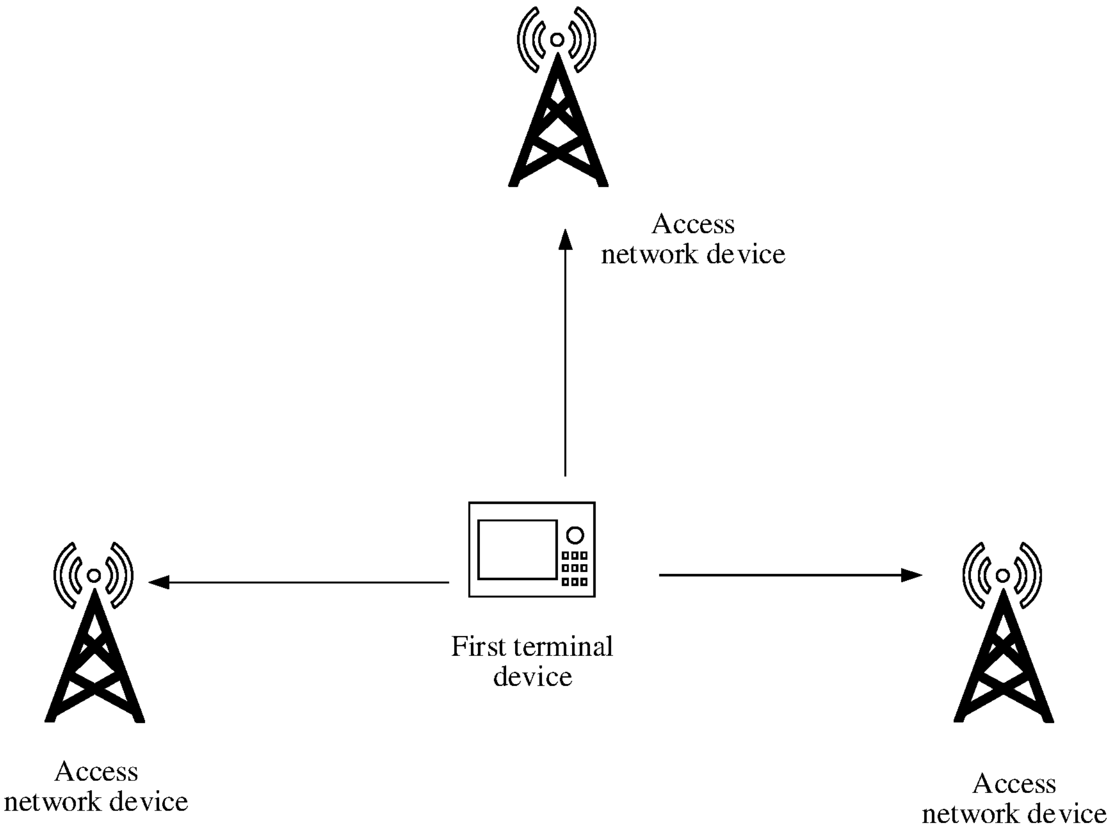
FIG. 6 is a schematic diagram of a positioning technology based on a triangle relationship.

A quantity of access network devices that perform measurement is related to a positioning calculation method used in the campus network. For example, in a positioning technology based on a triangle relationship, three access network devices with known positions need to measure the positioning signal of the terminal device. FIG. 6 is a schematic diagram of a positioning technology based on a triangle relationship. This positioning method can be performed only when three base stations with known positions cooperate. In FIG. 6, the access network devices at three different positions relative to the first terminal device separately measures the positioning signal sent by the first terminal device. In the flowchart shown in FIG. 5, three access network devices are shown, but an actual quantity of access network devices is not limited to three.

S505: Each access network device generates a second message based on the measurement result and the third message, and sends the second message to the first network element; and the first network element receives a second message from the one or more access network devices.

Specifically, the second message generated by each access network device carries the measurement result obtained by the access network device and the identifier of the first terminal device. Optionally, the second message further carries the positioning parameter of the first terminal device.

Optionally, before S505, the first network element may further establish a signaling connection to each of the one or more access network devices. The signaling connection is a signaling connection (for example, an NG-AP connection) at a device granularity, that is, establishment of the connection is not related to a terminal device (user). A signaling connection establishment process may be actively initiated by the access network device, or may be actively initiated by the first network element. This is not limited in this application. For example, the access network device sends a request message to the first network element, where the request message carries an identifier (RAN ID) of the access network device, information about a cell covered by the access network device (for example, a cell ID), and the like. After receiving the request message, the first network element returns a response message to the access network device, where the response message carries an identifier of the first network element (for example, a default AMF ID). Alternatively, the first network element sends a request message to the access network device, where the request message carries an identifier of the first network element (for example, a default AMF ID). After receiving the request message, the access network device returns a response message to the first network element, where the response message carries an identifier (RAN ID) of the access network device, information about a cell covered by the access network device (for example, a cell ID), and the like. For a specific implementation, refer to the 3GPP technical specification (Technical Specification, TS) 38.413 protocol.

S506: The first network element forwards the second message to the second network element based on the first correspondence and the identifier of the first terminal device included in the second message, and the second network element receives the second message from the first network element.

It should be understood that if only one access network device sends a second message to the first network element, the first network element forwards the second message to the second network element. If a plurality of access network devices send second messages to the first network element, the first network element may separately forward, to the second network element, a second message sent by each access network device. Alternatively, after receiving a plurality of second messages, the first network element may generate one message based on the plurality of second messages, and forward the message to the second network element. This is not limited in this application.

S507: The second network element sends the measurement result in the second message to a third network element, and the third network element receives the measurement result.

The third network element is configured to calculate a position of the terminal device. For example, the third network element is an LMF, and the second network element includes the positioning parameter and the measurement result in an LMF service message and sends the LMF service message to the third network element.

Optionally, the second message further carries the positioning parameter of the first terminal device, and the second network element further sends the positioning parameter of the first terminal device to the third network element.

Optionally, if the second message is an encrypted message, after receiving the second message, the second network element may decrypt the second message by using the encryption parameter in the context of the first terminal device. If the second message is a message on which integrity protection is performed, after receiving the second message, the second network element verifies integrity of the second message by using the integrity protection parameter in the context of the first terminal device. After the decryption is completed and/or the integrity verification succeeds, the second network element sends the positioning parameter, the measurement result, and the like in the second message to the third network element.

S508: The third network element calculates position information of the first terminal device based on the positioning parameter and the measurement result.

The positioning parameter may be reported by the first terminal device (for example, the positioning parameter is carried in the third message in S503), or may be pre-stored by the third network element, or may be obtained by the third network element from another network element, or may be pre-agreed by a network and the first terminal device. This is not limited in this application.

For example, the positioning parameter includes that the positioning method of the first terminal device is a time difference of arrival (TDOA) positioning method. In this case, by comparing a difference of absolute times of arrival of the positioning signal at any two access network devices, the third network element can obtain a hyperbolic curve that uses the two access network devices as focuses and uses a distance difference as a long axis. The third network element may obtain at least two curves based on distance differences between the first terminal device and at least three access network devices, and obtain the position information of the first terminal device by calculating an intersection point of the at least two hyperbolic curves.

S509: The third network element sends the position information of the first terminal device to an LCS client, and the LCS client receives the position information of the first terminal device.

For example, the position information of the first terminal device is carried in a multi-access edge computing (Multi-access Edge Computing, MEC) interface message and sent to the LCS client.

Optionally, after S509, the second network element and the first terminal device separately update the temporary identity of the first terminal device based on the locally stored freshness parameter, to protect position privacy of the first terminal device.

It can be learned from the foregoing that, in this embodiment of this application, when a capability of a terminal (for example, the first terminal device) that needs to be positioned is simplified (for example, a complete protocol stack defined by 3GPP is not supported), a fixed second network element is configured for each terminal device, and the first network element is configured in the campus network. When any terminal device reports a positioning message (for example, the third message), the first network element may route, based on a correspondence between the terminal device and a second network element corresponding to the terminal device, the positioning message of the terminal device to the second network element corresponding to the terminal device. In this way, positioning for the terminal device is implemented.

Figure 7:
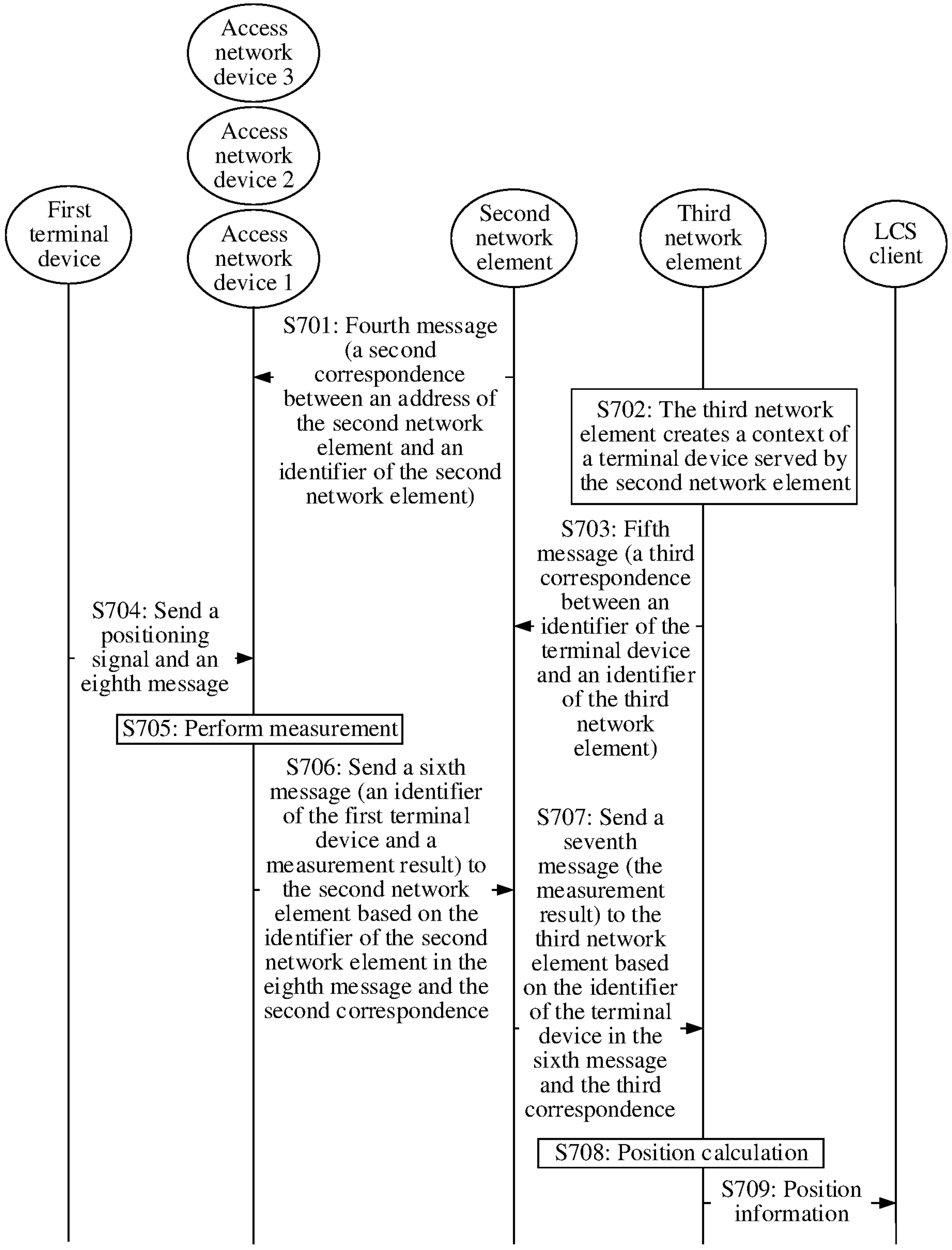
FIG. 7 is a flowchart of another positioning method according to an embodiment of this application.

FIG. 7 is a flowchart of another positioning method according to an embodiment of this application. Different from the method shown in FIG. 5, in this embodiment, a first network element does not need to be disposed, and a user context is configured on a third network element. A specific procedure of the method includes the following steps.

S701: A second network element sends a fourth message to one or more access network devices, and each of the one or more access network devices receives the fourth message from the second network element, where the fourth message includes a second correspondence between an address of the second network element and an identifier of the second network element.

The second network element is a network element that can establish a communication connection to the access network device. For example, the second network element is an AMF.

The identifier of the second network element herein may be a device identifier of an AMF, for example, a MAC address, or may be an identifier specially used to route a positioning message (the positioning message is a positioning-related message) reported by a terminal device to the second network element, for example, an AMF routing identifier (AMF Routing ID). An identifier of each second network element in the campus network is unique.

It should be understood that a plurality of second network elements and a plurality of access network devices may be deployed in the campus network. Before S701, each network element establishes a signaling connection to at least one access network device. The signaling connection is a signaling connection (for example, an NG-AP connection) at a device granularity, that is, is not related to a terminal device (user). A signaling connection establishment process may be actively initiated by the access network device, or may be actively initiated by the second network element. This is not limited in this application. For a specific implementation, refer to the 3GPP technical specification (Technical Specification, TS) 38.413 protocol.

After receiving the second correspondence between the address of the second network element and the identifier of the second network element, the access network device may store the second correspondence, and subsequently may determine, based on the second correspondence, the address of the second network element corresponding to the identifier of the second network element, or determine, based on the second correspondence, the identifier of the second network element corresponding to the address of the second network element.

S702: The third network element creates a context of a first terminal device, where the context includes an identifier of the first terminal device.

The third network element is configured to calculate a position of the first terminal device. For example, the third network element is an LMF.

Based on features of a campus network (a coverage area is smaller than a coverage area of a 5G network, and a terminal device activity area is smaller), in this embodiment of this application, a fixed third network element is allocated to each terminal device in the campus network, that is, each third network element serves a fixed terminal device. For example, each third network element provides a positioning service for a terminal device located in a preset range of the second network element. Further, a user may manually configure a context of each terminal device on a third network element to which the terminal device belongs. For a method for configuring a context by the user on the third network element, refer to the method for configuring a context by the user on the second network element in S501.

Optionally, the identifier of the first terminal device may be a temporary identity.

Further, optionally, the context of the first terminal device may include a decryption parameter, an integrity protection parameter, a freshness parameter, or the like. For specific meanings of the parameters, refer to the foregoing related descriptions. Details are not described herein again.

S703: The third network element sends a fifth message to the second network element, and the second network element receives the fifth message from the third network element, where the fifth message includes a third correspondence between the identifier of the first terminal device and an identifier of the third network element.

For ease of description, in this specification, the "third correspondence between the identifier of the first terminal device and the identifier of the third network element" may also be described as a "third correspondence between the first terminal device and the third network element".

It should be understood that if one third network element can simultaneously provide a positioning service for a plurality of terminal devices, the second network element may receive a correspondence between each of the plurality of terminal devices and the second network element from the first network element. If there are a plurality of third network elements in the campus network, the second network element may further receive correspondences between different third network elements and different terminal devices from the different third network elements.

In a possible design, for a correspondence between each terminal device and a third network element corresponding to the terminal device, the third network element corresponding to the terminal device separately sends a message to the second network element. For example, the fifth message may carry only the identifier of the first terminal device and the identifier of the third network element.

In another possible design, the third network element may send correspondences between the third network element and a plurality of terminal devices to the second network element together. For example, in addition to the identifier of the third network element and the identifier of the first terminal device, the fifth message may further carry an identifier of a second terminal device, an identifier of a third terminal device, and the like. The second terminal device, the third terminal device, and the first terminal device belong to a same third network element, that is, the second terminal device, the third terminal device, and the first terminal device correspond to a same third network element.

After receiving the third correspondence, the second network element stores the third correspondence. The second network element may determine, based on the third correspondence, that the first terminal device belongs to the third network element, or that the third network element provides a positioning service for the first terminal device.

In a possible design, the second network element may store, by using a mapping table, correspondences between a plurality of different terminal devices and third network elements corresponding to the plurality of different terminal devices. For example, the third network element is an LMF. Table 2 shows a plurality of correspondences. It can be learned from Table 1 that an LMF to which a terminal device UE 1 belongs is an LMF 1, an LMF to which a terminal device UE 2 belongs is an LMF 2, an LMF to which a terminal device UE 3 belongs is an LMF 3, an LMF to which a terminal device UE 4 belongs is an LMF 4, and the like.

TABLE 2

| Terminal device | Second network element (using an AMF as an example) |
|---|---|
| UE 1 | LMF 1 |
| UE 2 | LMF 2 |
| UE 3 | LMF 3 |
| UE 4 | LMF 4 |
| . . . | . . . |

It should be understood that there may be only one LMF serving one terminal device at each moment. However, a plurality of LMFs may be configured for one terminal device, and different LMFs may serve the terminal device at different moments.

It should be noted that a sequence between S701 and S702 and S703 is not limited in this application. In other words, S701 may be performed before S702 is performed, or after S703 is performed, or when S702 and S703 are performed.

S704: The first terminal device sends a positioning signal and an eighth message.

Optionally, the first terminal device broadcasts the positioning signal and the eighth message.

It should be understood that the first terminal device first broadcasts the positioning signal, and then broadcasts the eighth message. The eighth message includes the identifier of the first terminal device and the identifier of the second network element that provides a service for the first terminal device. Optionally, the eighth message further carries a positioning parameter of the first terminal device.

For example, the positioning signal may be an SRS, and the eighth message may be a long term evolution positioning protocol LPP message.

The positioning parameter may include one or more of the following: a positioning capability of the first terminal device, a positioning method of the first terminal device, positioning precision of the first terminal device, a positioning frequency of the first terminal device, a notification address of a positioning result of the first terminal device, and the like.

Optionally, when generating the third message, the first terminal device may further encrypt the third message by using an encryption parameter and/or perform integrity protection on the third message by using an integrity protection parameter.

S705: Each of the one or more access network devices receives the positioning signal and the eighth message that are sent by the first terminal device, and each access network device measures the positioning signal to obtain a measurement result.

For a measurement process performed by the access network device, refer to related descriptions in S504. Details are not described herein again.

S706: Each access network device sends a sixth message to the second network element based on the identifier of the second network element in the eighth message and the second correspondence, and the second network element receives a sixth message from the one or more access network devices.

Specifically, each access network device includes the identifier of the first terminal device and the measurement result in the sixth message based on the measurement result and the identifier of the first terminal device in the eighth message, then finds the address of the second network element based on the identifier of the second network element carried in the eighth message and the second correspondence, and sends the sixth message to the second network element. Optionally, the eighth message and the sixth message further include the positioning parameter of the first terminal device.

S707: The second network element sends a seventh message to the third network element based on the third correspondence and the identifier of the first terminal device in the sixth message, and the third network element receives the seventh message from the second network element, where the seventh message includes the measurement result.

If only one access network device sends a sixth message to the second network element, the second network element may directly forward the sixth message to the third network element (the seventh message is the sixth message). If a plurality of access network devices send sixth messages to the second network element, the second network element may separately forward, to the second network element, a sixth message (the seventh message is the sixth message) sent by each access network device. Alternatively, after receiving a plurality of sixth messages, the second network element may generate one seventh message based on the plurality of sixth messages, and forward the seventh message to the second network element. This is not limited in this application.

S708: The third network element determines position information of the first terminal device based on the positioning parameter and the measurement result.

If the seventh message is an encrypted message, after receiving the seventh message, the third network element decrypts the seventh message by using the encryption parameter in the context of the first terminal device. If the seventh message is a message on which integrity protection is performed, after receiving the seventh message, the third network element verifies integrity of the seventh message by using the integrity protection parameter in the context of the first terminal device. After the decryption is completed and/or the integrity verification succeeds, the third network element determines the position information of the first terminal device based on the positioning parameter of the first terminal device, the measurement result, and the like.

The positioning parameter may be reported by the first terminal device (for example, the positioning parameter is carried in the eighth message in S704), or may be pre-stored by the third network element, or may be obtained by the third network element from another network element, or may be pre-agreed by a network and the first terminal device. This is not limited in this application.

For determining, by the third network element, the position information of the first terminal device based on the positioning parameter and the measurement result, refer to related descriptions in S509. Details are not described herein again.

S709: The third network element sends the position information of the first terminal device to an LCS client, and the LCS client receives the position information of the first terminal device.

For a specific implementation method of S709, refer to the specific implementation method of S510. Details are not described herein again.

Optionally, after S709, the third network element and the first terminal device separately update the temporary identity of the first terminal device based on the locally stored freshness parameter, to protect position privacy of the first terminal device.

It can be learned from the foregoing that, in this embodiment of this application, when a capability of a terminal (for example, the first terminal device) that needs to be positioned is simplified (for example, a complete protocol stack defined by 3GPP is not supported), a fixed second network element is configured for each terminal device. When reporting a positioning message (which is a message related to terminal device positioning, for example, the eighth message), any terminal device uses the positioning message to carry an identifier of a second network element corresponding to the terminal device, so that the access network device can route, based on the identifier of the second network element in the positioning message, the positioning message to the second network element corresponding to the terminal device. This implements positioning for the terminal device.

Figure 8:
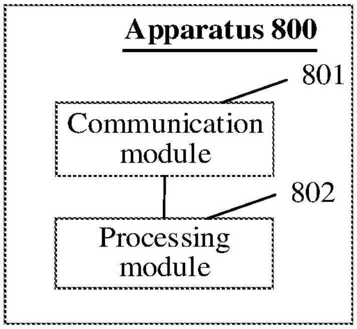
FIG. 8 is a schematic diagram of a structure of a positioning apparatus according to an embodiment of this application.

As shown in FIG. 8, based on a same technical concept, an embodiment of this application further provides a positioning apparatus 800. The apparatus 800 includes a communication module 801 and a processing module 802. The communication module 801 may communicate with another network element or device. The processing module 802 may perform, by controlling the communication module 801, a method step performed by any network element or device in the embodiment shown in FIG. 5 or FIG. 7.

For example, when the apparatus 800 is located in the first network element in the embodiment shown in FIG. 5, the communication module 801 is used by the first network element to communicate with another network element; and the processing module 802 is configured to: receive a first message from a second network element using the communication module 801, where the first message includes a first correspondence between an identifier of a first terminal device and an identifier of the second network element; store the first correspondence; receive a second message from one or more access network devices using the communication module 801, where the second message includes the identifier of the first terminal device and a measurement result for a positioning signal sent by the first terminal device; and forward the second message to the second network element using the communication module 801 based on the first correspondence and the identifier of the first terminal device included in the second message.

For example, when the apparatus 800 is located in the second network element shown in FIG. 5, the communication module 801 is used by the second network element to communicate with another network element; and the processing module 802 is configured to: create a context of a first terminal device, where the context includes an identifier of the first terminal device; send a first message to a first network element using the communication module 801, where the first message includes a first correspondence between the identifier of the first terminal device and an identifier of the second network element; receive a second message from the first network element using the communication module 801, where the second message is sent by the first network element to the second network element based on the first correspondence, and the second message includes the identifier of the first terminal device and a measurement result for a positioning signal sent by the first terminal device; and send the measurement result in the second message to a third network element using the communication module 801, where the third network element is configured to determine position information of the first terminal device based on the measurement result.

For example, when the apparatus 800 is located in the access network device shown in FIG. 5, the communication module 801 is used by the access network device to communicate with another network element or device; and the processing module 802 is configured to: receive, using the communication module 801, a positioning signal sent by a first terminal device; measure the positioning signal to obtain a measurement result; receive, using the communication module 801, a third message sent by the first terminal device, where the third message includes an identifier of the first terminal device; generate a second message based on the measurement result and the third message; and send the second message to a first network element using the communication module 801, where the second message includes the identifier of the first terminal device and the measurement result for the first terminal device.

For example, when the apparatus 800 is located in the first terminal device shown in FIG. 5, the communication module 801 is used by the first terminal device to communicate with another network element or device; and the processing module 802 is configured to: generate a positioning signal and a third message; and send the positioning signal and the third message using the communication module 801, where the third message includes an identifier of the first terminal device.

For example, when the apparatus 800 is located in the access network device shown in FIG. 7, the communication module 801 is used by the access network device to communicate with another network element or device; and the processing module 802 is configured to: receive a fourth message from a second network element using the communication module 801, where the fourth message includes a second correspondence between an address of the second network element and an identifier of the second network element; receive, using the communication module 801, a positioning signal sent by a first terminal device; measure the positioning signal to obtain a measurement result; receive, using the communication module 801, an eighth message sent by the first terminal device, where the eighth message includes an identifier of the first terminal device and the identifier of the second network element; and send a sixth message to the second network element using the communication module 801 based on the identifier of the second network element in the eighth message and the second correspondence, where the sixth message includes the identifier of the first terminal device and the measurement result.

For example, when the apparatus 800 is located in the second network element shown in FIG. 7, the communication module 801 is used by the second network element to communicate with another network element; and the processing module 802 is configured to: send a fourth message to one or more access network devices using the communication module 801, where the fourth message includes a second correspondence between an address of the second network element and an identifier of the second network element; receive a fifth message from a third network element using the communication module 801, where the fifth message includes a third correspondence between an identifier of a first terminal device and an identifier of the third network element; store the third correspondence; receive a sixth message from the one or more access network devices using the communication module 801, where the sixth message includes the identifier of the first terminal device and a measurement result of the at least one access network device for a positioning signal sent by the first terminal device, and the sixth message is sent by the access network device to the second network element based on the second correspondence; and send a seventh message to the third network element using the communication module 801 based on the third correspondence and the identifier of the first terminal device in the sixth message, where the seventh message includes the measurement result, and the third network element is configured to determine position information of the first terminal device based on the measurement result.

For example, when the apparatus 800 is located in the third network element shown in FIG. 7, the communication module 801 is used by the third network element to communicate with another network element; and the processing module 802 is configured to: create a context of a first terminal device, where the context includes an identifier of the first terminal device; send a fifth message to a second network element using the communication module 801, where the fifth message includes a third correspondence between the identifier of the first terminal device and an identifier of the third network element; receive a seventh message from the second network element using the communication module 801, where the seventh message includes a measurement result for a positioning signal sent by the first terminal device, and the seventh message is sent by the second network element to the third network element based on the third correspondence; and determine position information of the first terminal device based on the measurement result.

For example, when the apparatus 800 is located in the first terminal device shown in FIG. 7, the communication module 801 is used by the first terminal device to communicate with another network element or device; and the processing module 802 is configured to: generate a positioning signal and an eighth message; and send the positioning signal and the eighth message using the communication module 801, where the eighth message includes an identifier of the first terminal device and an identifier of a second network element.

It should be understood that all related content of the steps in the foregoing method embodiments may be cited in function descriptions of corresponding function modules. Details are not described herein again.

Figure 9:
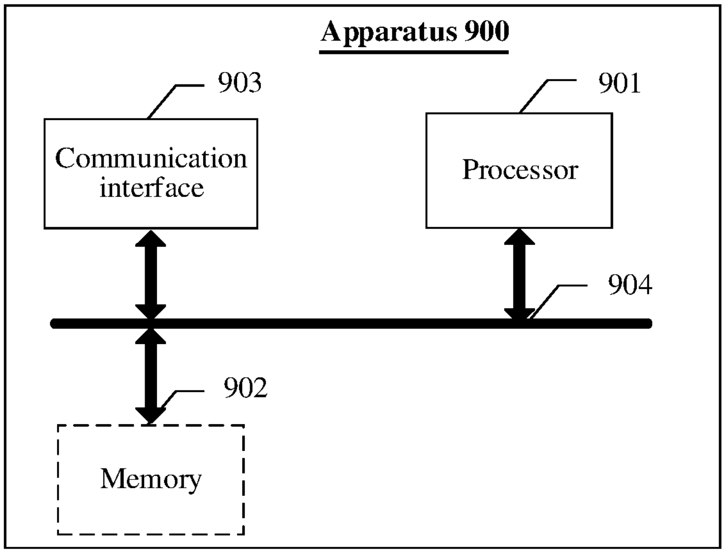
FIG. 9 is a schematic diagram of a structure of a positioning apparatus according to an embodiment of this application.

As shown in FIG. 9, based on a same technical concept, an embodiment of this application further provides a positioning apparatus 900, including at least one processor 901 and a communication interface 903 communicatively connected to the at least one processor 901. The at least one processor 901 executes instructions stored in a memory 902, so that the apparatus performs, by using the communication interface 903, a method step performed by any network element or device in the embodiment shown in FIG. 5 or FIG. 7.

Optionally, the memory 902 is located outside the apparatus 900.

Optionally, the apparatus 900 includes the memory 902, the memory 902 is connected to the at least one processor 901, and the memory 902 stores instructions that can be executed by the at least one processor 901.

Optionally, the memory 902 is located outside the apparatus 900.

Optionally, the apparatus 900 includes the memory 902, the memory 902 is connected to the at least one processor 901, and the memory 902 stores instructions that can be executed by the at least one processor 901. In FIG. 9, a dashed line is used, to indicate that the memory 902 is optional for the apparatus 900.

The processor 901 and the memory 902 may be coupled by using an interface circuit, or may be integrated together. This is not limited herein.

A specific connection medium between the processor 901, the memory 902, and the communication interface 903 is not limited in this embodiment of this application. In this embodiment of this application, in FIG. 9, the processor 901, the memory 902, and the communication interface 903 are connected by using a bus 904. The bus is represented by a bold line in FIG. 9. A manner of connection between other components is merely an example for description, and is not limited thereto. The bus may be classified into an address bus, a data bus, a control bus, or the like. For ease of representation, only one bold line is used for representation in FIG. 9, but this does not mean that there is only one bus or only one type of bus.

It should be understood that the processor mentioned in embodiments of this application may be implemented by using hardware or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

For example, the processor may be a central processing unit (Central Processing Unit, CPU), or may be another general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a discrete gate or a transistor logic device, a discrete hardware component, or the like. The general-purpose processor may be a microprocessor, or the processor may be any conventional processor or the like.

It may be understood that the memory mentioned in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (Erasable PROM, EPROM), an electrically erasable programmable read-only memory (Electrically EPROM, EEPROM), or a flash memory. The volatile memory may be a random access memory (RAM), which is used as an external cache. By way of example and not limitation, many forms of RAMs are available, such as a static random access memory (Static RAM, SRAM), a dynamic random access memory (Dynamic RAM, DRAM), a synchronous dynamic random access memory (Synchronous DRAM, SDRAM), double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general-purpose processor, a DSP, an ASIC, an FPGA or another programmable logic device, a discrete gate or a transistor logic device, or a discrete hardware component, the memory (a storage module) may be integrated into the processor.

It should be noted that the memory described in this specification aims to include but is not limited to these memories and any memory of another proper type.

Figure 10:
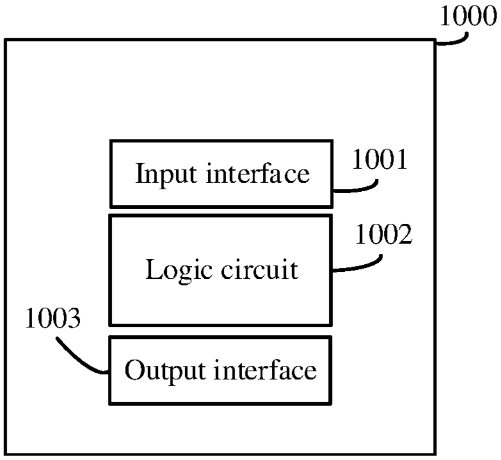
FIG. 10 is a schematic diagram of a structure of a chip according to an embodiment of this application.

As shown in FIG. 10, based on a same technical concept, an embodiment of this application further provides a chip 1000, which may be configured to perform a method step performed by any network element or device in the embodiment shown in FIG. 5 or FIG. 7. The chip woo includes:

at least one input interface (Input(s)) 1001, a logic circuit 1002, and at least one output interface (Output(s)) 1003.

Optionally, the logic circuit 1002 may be a chip, an encoder, an encoding circuit, or another integrated circuit that can implement the method in this application.

Based on a same technical concept, an embodiment of this application further provides a computer-readable storage medium, including a program or instructions. When the program or the instructions are run on a computer, a method step performed by any network element or device in the embodiment shown in FIG. 5 or FIG. 7 is performed.

Based on a same technical concept, an embodiment of this application further provides a computer program product, including instructions. When the computer program product runs on a computer, a method step performed by any network element or device in the embodiment shown in FIG. 5 or FIG. 7 is performed.

A person skilled in the art should understand that embodiments of this application may be provided as a method, a system, or a computer program product. Therefore, this application may be in a form of a hardware-only embodiment, a software-only embodiment, or an embodiment combining software and hardware aspects. In addition, this application may be in a form of a computer program product implemented on one or more computer-usable storage media (including but not limited to a magnetic disk memory, a CD-ROM, an optical memory, and the like) including computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

It is clear that a person skilled in the art may make various modifications and variations to this application without departing from the spirit and the scope of this application. Thus, this application is intended to cover these modifications and variations, provided that they fall within the scope of the claims of this application and their equivalent technologies.

What is claimed is:

1. A method, comprising:

sending, by a second network element, a fourth message to one or more access network devices, wherein the fourth message comprises a second correspondence between an address of the second network element and an identifier of the second network element;

receiving, by the second network element, a fifth message from a third network element, wherein the fifth message comprises a third correspondence between an identifier of a first terminal device and an identifier of the third network element, and storing, by the second network element, the third correspondence;

receiving, by the second network element, a sixth message from the one or more access network devices, wherein the sixth message comprises the identifier of the first terminal device and a measurement result for a positioning signal from the first terminal device, the sixth message is from the one or more access network devices to the second network element, and the sixth message is based on the second correspondence; and sending, by the second network element, a seventh message to the third network element based on the third correspondence and the identifier of the first terminal device in the sixth message, wherein the seventh message comprises the measurement result, and the third network element is configured to determine position information of the first terminal device based on the measurement result.

2. The method according to claim 1, wherein the seventh message further comprises a positioning parameter of the first terminal device.

3. The method according to claim 2, wherein the positioning parameter is an encryption or integrity protected parameter.

4. The method according to claim 3, wherein the positioning parameter comprises one or more of the following: a positioning capability of the first terminal device, a positioning method of the first terminal device, positioning precision of the first terminal device, a positioning frequency of the first terminal device, or a notification address of a positioning result of the first terminal device.

5. The method according to claim 1, wherein the sixth message further comprises a positioning parameter of the first terminal device.

6. The method according to claim 1, wherein the second network element has a signaling connection to each access network device of the one or more access network devices.

7. The method according to claim 1, wherein the second network element is an access and mobility management function.

8. The method according to claim 1, further comprising:

receiving, by a first access network device of the one or more access network devices, the fourth message from the second network element;

receiving, by the first access network device, the positioning signal from the first terminal device, measuring the positioning signal to obtain the measurement result, and receiving an eighth message from the first terminal device, wherein the eighth message comprises the identifier of the first terminal device and the identifier of the second network element; and sending, by the first access network device, the sixth message to the second network element based on the identifier of the second network element in the eighth message and the second correspondence.

9. The method according to claim 1, further comprising:

creating, by the third network element, a context of the first terminal device, wherein the context comprises the identifier of the first terminal device;

sending, by the third network element, the fifth message to the second network element;

receiving, by the third network element, the seventh message from the second network element; and determining, by the third network element, the position information of the first terminal device based on the measurement result.

10. The method according to claim 9, wherein the third network element is a location management function.

11. The method according to claim 1, further comprising:

sending, by the first terminal device, the positioning signal; and sending, by the first terminal device, an eighth message, wherein the eighth message comprises the identifier of the first terminal device and the identifier of the second network element.

12. The method according to claim 11, wherein the eighth message further comprises a positioning parameter of the first terminal device.

13. A second network element, comprising:

at least one processor; and one or more memories coupled to the at least one processor and storing programming instructions for execution by the at least one processor, wherein execution of the programming instructions enables the second network element to perform operations comprising:

sending a fourth message to one or more access network devices, wherein the fourth message comprises a second correspondence between an address of the second network element and an identifier of the second network element;

receiving a fifth message from a third network element, wherein the fifth message comprises a third correspondence between an identifier of a first terminal device and an identifier of the third network element, and storing the third correspondence;

receiving a sixth message from the one or more access network devices, wherein the sixth message comprises the identifier of the first terminal device and a measurement result for a positioning signal from the first terminal device, and the sixth message is sent from the one or more access network devices to the second network element based on the second correspondence; and sending a seventh message to the third network element based on the third correspondence and the identifier of the first terminal device in the sixth message, wherein the seventh message comprises the measurement result, and the third network element is configured to determine position information of the first terminal device based on the measurement result.

14. The second network element according to claim 13, wherein the seventh message or the sixth message further comprises a positioning parameter of the first terminal device.

15. The second network element according to claim 14, wherein the positioning parameter is an encryption or integrity protected parameter.

16. The second network element according to claim 15, wherein the positioning parameter comprises one or more of the following: a positioning capability of the first terminal device, a positioning method of the first terminal device, positioning precision of the first terminal device, a positioning frequency of the first terminal device, or a notification address of a positioning result of the first terminal device.

17. The second network element according to claim 13, wherein the second network element is an access and mobility management function.

18. A system, comprising:

a second network element configured to:

send a fourth message to one or more access network devices, wherein the fourth message comprises a second correspondence between an address of the second network element and an identifier of the second network element;

receive a fifth message from a third network element, wherein the fifth message comprises a third correspondence between an identifier of a first terminal device and an identifier of the third network element; and store the third correspondence;

receive a sixth message from the one or more access network devices, wherein the sixth message comprises the identifier of the first terminal device and a measurement result for a positioning signal from the first terminal device, and the sixth message is sent from the access network device to the second network element based on the second correspondence; and send a seventh message to the third network element based on the third correspondence and the identifier of the first terminal device in the sixth message, wherein the seventh message comprises the measurement result, and the third network element is configured to determine position information of the first terminal device based on the measurement result; and the third network element, configured to:

create a context of the first terminal device, wherein the context comprises the identifier of the first terminal device;

send the fifth message to the second network element;

receive the seventh message from the second network element; and determine the position information of the first terminal device based on the measurement result.

19. The system according to claim 18, further comprising:

the one or more access network devices, configured to:

receive the fourth message from the second network element;

receive the positioning signal from the first terminal device, measure the positioning signal to obtain the measurement result, and receive an eighth message from the first terminal device, wherein the eighth message comprises the identifier of the first terminal device and the identifier of the second network element; and send the sixth message to the second network element based on the identifier of the second network element in the eighth message and the second correspondence.

20. The system according to claim 18, further comprising:

the first terminal device configured to:

send the positioning signal; and send an eighth message, wherein the eighth message comprises the identifier of the first terminal device and the identifier of the second network element.

* * * * *